Sept. 14, 1937.  E. LUNDBORG  2,093,330
DEVICE FOR CONNECTING PISTON RODS AND CROSS HEADS IN ENGINES
Filed June 8, 1935
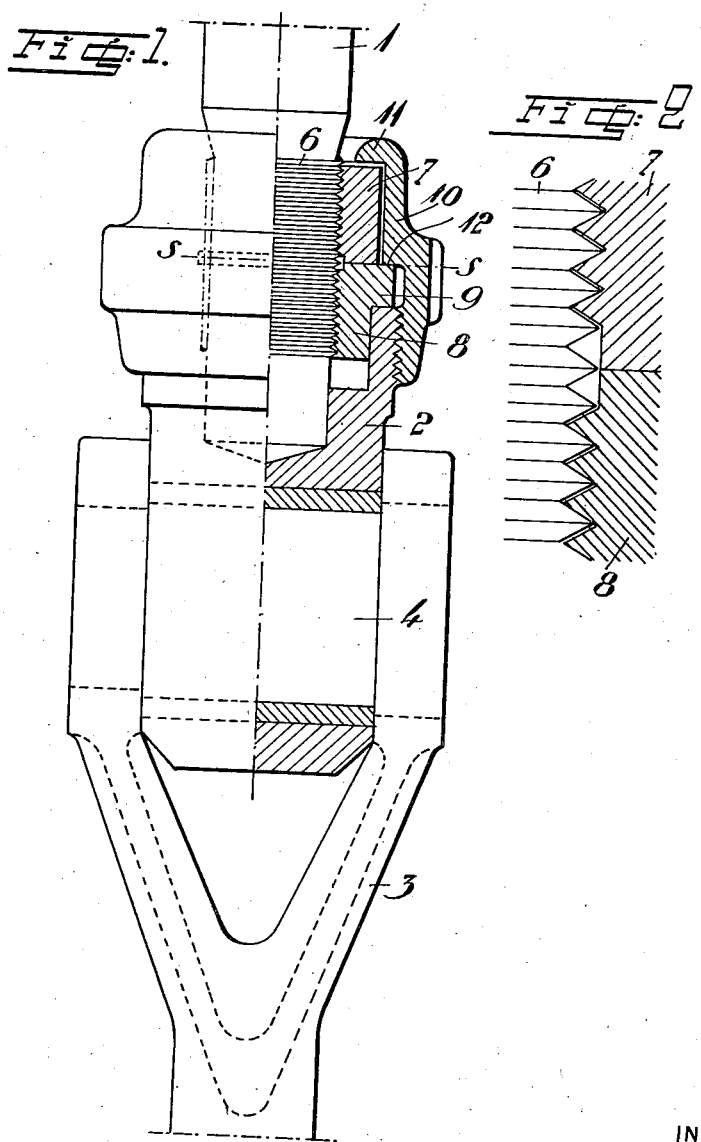
INVENTOR
Einar Lundborg
BY
ATTORNEY Patented Sept. 14, 1937

2,093,330

UNITED STATES PATENT OFFICE 2,093,330

DEVICE FOR CONNECTING PISTON RODS AND CROSS HEADS IN ENGINES

Einar Lundborg, Enskede, near Stockholm, Sweden, assignor to Aktiebolaget Atlas Diesel, Stockholm, Sweden, a corporation of Sweden Application June 8, 1935, Serial No. 25,559
In Sweden January 11, 1934

2 Claims. (Cl. 287—20)

The present invention has for its object a device for connecting the piston-rod and the crosshead of engines, especially double acting engines, by means of a nut-joint which permits of adjustment of the piston and subsequent locking of the nut-joint in such a manner that any danger of the nut-joint working loose as a result of the alternating stress is as far as possible avoided. According to the invention, the connecting device includes two nuts screwed on a threaded end of the piston rod and which are tightened against each other so that they and their threads press in opposite directions against the threads on the piston rod, and a connecting member, which joins the nuts to the cross-head. One of the nuts is held tight against the cross-head, for example by means of a cap-nut threaded on the crosshead, so that the power from the piston rod is transmitted directly to the cross-head in the one direction and through the cap-nut only in the other direction. Thus, the danger that this nut will work loose is only small and, in addition, the cap-nut can easily be locked. The cap-nut may suitably be so arranged that, in case a break occurs in the piston-rod between the nuts as a result of an initial strain in the rod caused by the nuts, said cap-nut will hold the pieces together until the damage, as a result of the noise, hase been discovered and the motor stopped.

The accompanying drawing shows a form of execution of a joint device according to this invention. Fig. 1 is a side elevation and, in part, in vertical section.

Fig. 2 shows a section through one part of the piston rod and nuts on a larger scale for illustrating the thread engagement.

1 is the piston rod of a double acting engine, for example, an internal combustion engine. The piston rod does not pass through the cross-head, which is designated by 2, and 3 is the connecting rod, connected with the cross-head by the pin 4. The lower part of the piston-rod is provided with threads 6 on which the two nuts 7 and 8 are screwed. When the aggregate is being assembled, these nuts are drawn tight against each other so that a certain initial strain arises in the rod along the line S—S between the nuts 7 and 8. The lower nut 8 is provided with a flange 9 or the like extending beyond the nut 7 and resting on the cross-head. Over the flange 9 there is arranged a cap-nut 10 which is threaded on to the cross-head 2 and provided with a flange 12 adapted to press the nut 8 and its flange 9 against the cross-head 2.

When the engine is working, the piston-rod alternately pushes and pulls. It is of the utmost importance if the joint is to be maintained that the transmitting parts do not tend to work loose during this process. When the piston-rod is pushing, the push passes through the upper nut 7, causing an increase of pressure in the threads as is shown by the upper part of Fig. 2 so that a still greater locking-effect arises. The push from the nut 7 is transmitted by means of the nut 8 and the flange 9 directly to the cross-head 2. When the piston-rod is pulling, the pull is taken up by the lower nut 8 as is shown by the lower part of Fig. 2. Thus, a tendency for the nuts to work loose as a result of the alternating stress need not be feared. The pull referred to is transmitted by the cap-nut 10 to the crosshead. Thus, the cap-nut is only subjected to tension from a single direction and its tendency to work loose is therefore less and can further be entirely prevented by an easily contrived locking of the nut.

At the upper end of the cap-nut 10 there is a flange 11 or the like extending inwards over the nut 7 but with a little play between. The object of this arrangement is that in case of a break in the piston rod between the nuts 7 and 8, the cap-nut 10 shall to some extent hold the pistonrod in its original position. As a result of the above-mentioned initial stress in the piston-rod which arises when the nuts 7 and 8 are tightened, the biggest strain in the piston-rod occurs along the line S—S, and it is therefore here that a break is most probable. If such a break occurs, the piston-rod is still connected with the crosshead by the cap-nut 10 and the rattle which arises in the joint between the piston-rod and the cross-head makes the engineer notice the break so that he can stop the motor before an accident happens.

It is evident that the invention can be modified in various respects without departing from the idea on which it is based.

I claim:

1. Device for connecting piston-rod and crosshead in engines, comprising a piston-rod threaded at its one end, a cross-head, two nuts screwed on the threaded end of the piston-rod and tightened against one another as lock-nuts, a flange on the lowermost of said nuts adapted to apply against a supporting surface on the crosshead, a cap-nut adapted to be screwed on a threaded portion of the cross-head, a flange on said cap-nut adapted to be applied against the flange of said lowermost nut and press the same against the cross-head when the cap-nut is tightened, and a further flange on the cap-nut extending inwards over the uppermost nut with a play between them.

2. In combination, a cross-head, a threaded piston-rod, a nut threaded on said rod, a member for clamping said nut rigidly to said cross-head for force transmission in compression from the body portion of the nut to the cross-head and for force transmission in tension from the body portion of the nut through said member to said cross-head and a second nut threaded on said rod on the side of the first mentioned nut remote from the cross-head and tightened to lock the two nuts on the rod, said member having a portion spaced from the face of the last mentioned nut remote from the cross-head and adapted to engage said face upon relative movement of said second nut toward and away from the cross-head due to breakage of said rod, whereby to transmit force in tension through said second nut to said cross-head in the event of such breakage.

EINAR LUNDBORG.